(12) United States Patent
De Sousa (10) Patent No.: US 9,685,853 B2
(45) Date of Patent: Jun. 20, 2017

(54) ABSORPTION CIRCUIT FOR ABSORBING A POWER RIPPLE AND ASSOCIATED METHOD

(71) Applicant: Valeo Systemes de Controle Moteur, Cergy Pontoise (FR)

(72) Inventor: Luis De Sousa, Eragny sur Oise (FR)

(73) Assignee: VALEO SYSTEMES DE CONTROLE MOTEUR, Cergy Pontoise (FR)

( * ) Notice: Subject to any disclaimer, the term of this patent is extended or adjusted under 35 U.S.C. 154(b) by 87 days.

(21) Appl. No.: 14/405,484

(22) PCT Filed: Jun. 6, 2013

(86) PCT No.: PCT/FR2013/051287
§ 371 (c)(1),
(2) Date: Dec. 4, 2014

(87) PCT Pub. No.: WO2013/182813
PCT Pub. Date: Dec. 12, 2013

(65) Prior Publication Data
US 2015/0155772 A1 Jun. 4, 2015

(30) Foreign Application Priority Data
Jun. 6, 2012 (FR) ..................... 12 55280

(51) Int. Cl.
*G05F 1/00* (2006.01)
*G05F 1/565* (2006.01)
(Continued)

(52) U.S. Cl.
CPC ............... *H02M 1/14* (2013.01); *H02J 1/02* (2013.01); *H02M 1/15* (2013.01); *H02M 1/4208* (2013.01)

(58) Field of Classification Search
CPC ... H02M 2001/0009; H02M 2001/344; H02M 2001/4283; H02M 2001/4291;
(Continued)

(56) References Cited

U.S. PATENT DOCUMENTS 6,188,206 B1 * 2/2001 Nguyen ............. H02M 3/1563
323/222
7,733,678 B1 * 6/2010 Notohamiprodjo . H02M 1/4225
323/222
(Continued)

FOREIGN PATENT DOCUMENTS

FR        2 938 711 A1    5/2010
FR        2944391 A1     10/2010
WO       02/05412 A1     1/2002

OTHER PUBLICATIONS

International Search Report for corresponding International Application No. PCT/FR2013/051287, mailed Nov. 14, 2013 (3 pages).

*Primary Examiner* — Adolf Berhane
*Assistant Examiner* — Gary Nash
(74) *Attorney, Agent, or Firm* — Osha Liang LLP (57) ABSTRACT

The present invention concerns an absorption circuit (9) for absorbing a power ripple intended to be connected in parallel to a piece of electrical equipment powered by a power factor correction circuit (1), said absorption circuit (9) being a step down voltage circuit comprising: —a capacitor (19) mounted in series with an inductor (17) and at least one switch (15, 23), —a control module (25), —means (27) for measuring a first current ($I_3$) intended to power said electrical equipment, the switch (15, 23) being controlled by the control module (25) to vary the charging of the capacitor on the basis of the ripple of the first current (I3) in order to attenuate the power ripple, and said circuit further comprising means (28) for measuring the voltage (Vc) at the terminals of the capacitor (19), and the control module (25)
(Continued)

being configured to control a second current (Ic) flowing through the capacitor (19) in such a way that the voltage (Vc) at the terminals of the capacitor (19) remains within a predefined interval.

18 Claims, 9 Drawing Sheets

(51) Int. Cl.
  *H02M 1/14* (2006.01)
  *H02M 1/15* (2006.01)
  *H02J 1/02* (2006.01)
  *H02M 1/42* (2007.01)
(58) Field of Classification Search
  CPC .......... H02M 1/14; H02M 1/143; H02M 1/15; H02M 1/34; H02M 1/126; H02M 1/4266; G05F 1/462; G05F 1/465; G05F 1/565; G05F 1/613; G05F 1/618
  USPC ....... 323/222–226, 242, 243, 266, 270, 274, 323/275, 282, 284, 285, 288; 363/45–48
  See application file for complete search history.

(56) References Cited

U.S. PATENT DOCUMENTS

| | | | | |
|---|---|---|---|---|
| 7,884,582 | B2* | 2/2011 | Viitanen | H02M 1/4208 323/207 |
| 2007/0152601 | A1* | 7/2007 | Nerone | H02M 1/15 315/209 R |
| 2007/0236968 | A1* | 10/2007 | Wu | H02M 1/14 363/39 |
| 2007/0262753 | A1* | 11/2007 | Hu | H02M 1/14 323/207 |
| 2009/0015229 | A1* | 1/2009 | Kotikalapoodi | H02M 3/1582 323/285 |
| 2010/0014326 | A1* | 1/2010 | Gu | H02M 1/14 363/45 |
| 2010/0225385 | A1* | 9/2010 | Claassen | G03G 15/80 327/552 |
| 2011/0101949 | A1* | 5/2011 | Lopata | H02M 3/1588 323/286 |

\* cited by examiner

Fig.1

PRIOR ART

ABSORPTION CIRCUIT FOR ABSORBING A POWER RIPPLE AND ASSOCIATED METHOD

Figure 1:
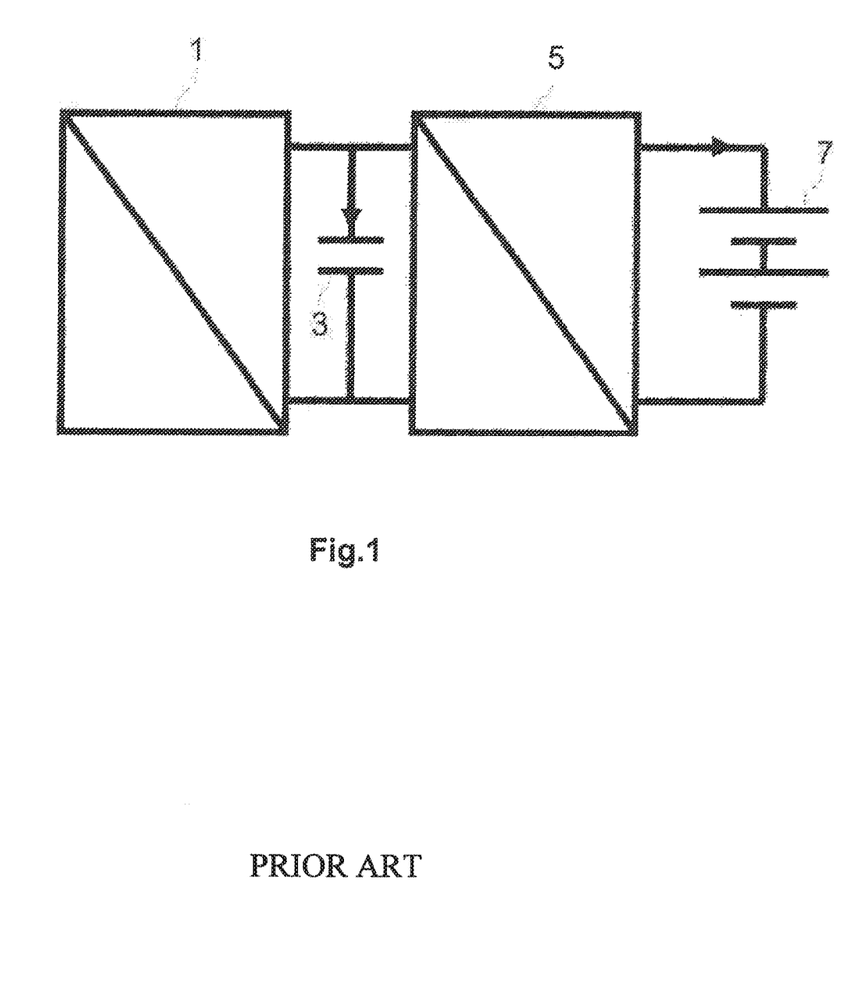
FIG. 1 represents an electrical circuit diagram of a battery charger according to the prior art.

The embodiments of the present invention relate to electrical equipment items comprising a power factor corrector (PFC) and, more particularly, the voltage converters intended to recharge accumulation means from an electrical network. The power factor corresponds to the phase shift that exists between the current and the voltage delivered by the electrical network. Thus, the role of a power factor corrector is to absorb a current that is in phase with the voltage of the electrical network to minimize the reactive power and maximize the active power. The power factor corrector therefore acts as an AC-DC converter. However, the power of the output of the power factor corrector is not purely DC but includes a sinusoidal component. Now, if accumulation means like, for example, a battery have to be recharged, this sinusoidal component has to be eliminated in order to ensure a correct charging of the battery and avoid premature wear thereof. Thus, as represented in FIG. 1, a capacitor 3 is added at the output of the power factor corrector 1 to serve as a buffer and a DC/DC voltage converter is added to erase the variations of voltage (and/or of current). The DC/DC converter 5 is also used at the output of the capacitor 3 to adapt the voltage value to the voltage that can be accepted by the battery 7. However, the value of the capacitor 3 is generally very high (several thousands of μF) to adequately reduce the 100 or 120 Hz voltage ripple and support the effective current value. In effect, the power consumed on the electrical network is pulsed at 100 Hz for a 50 Hz network and at 120 Hz for a 60 Hz network. Furthermore, these high capacitor values generally dictate the use of chemical capacitors because of their great energy density. These chemical capacitors have short lifetimes.

In order to at least partially overcome the abovementioned drawbacks of the prior art and propose a solution that makes it possible to obtain a DC power at the output of a power factor corrector without requiring the use of very large capacitors.

Thus, the embodiments of the present invention relate to an absorption circuit for absorbing a power ripple intended to be connected in parallel to an electrical equipment item powered by a power factor correction circuit, characterized in that said absorption circuit is of voltage step-down type and comprises a capacitor mounted in series with an inductor, at least one switch, one control module, and measurement means for measuring a first current intended to power said electrical equipment item, the switch being controlled by the control module to vary the charging of the capacitor as a function of the ripple of the first current in order to attenuate the power ripple.

According to one embodiment, the absorption circuit also comprises measurement means for measuring a second current passing through the capacitor and the control module comprises a first control loop configured to lock the value of the second current passing through the capacitor to a first reference value, a second control loop being configured to lock the first reference value as a function of the first current powering said electrical equipment item.

According to one embodiment, the second control loop comprises a bandpass filter in order to filter the DC component and the frequencies linked to the noise in the first current powering said electrical equipment item, and means for subtracting the output of the bandpass filter from a second reference value to establish the first reference value.

According to one embodiment, the absorption circuit comprises measurement means for measuring the voltage at the terminals of the capacitor, and the control module also comprises a third control loop configured in such a way that the voltage at the terminals of the capacitor remains within a predefined interval.

According to one embodiment, the voltage at the terminals of the capacitor is regulated by modifying the second reference value at the level of the third control loop.

According to one embodiment, the absorption circuit comprises a branch having at least one switch controlled by the control module and connected to an end of the capacitor and of the inductor mounted in series.

According to one embodiment, the absorption circuit comprises two branches connected on either side of the capacitor and of the inductor mounted in series, said two branches comprising switches connected in series and being intended to be mounted in parallel with the electrical equipment item, the switches being controlled by the control module to vary the charging of the capacitor as a function of the ripple of the first current in order to attenuate the power ripple.

The invention also relates to an AC voltage to DC voltage converter intended to power an electrical equipment item comprising a power factor correction circuit connected to an absorption circuit according to the invention.

According to one embodiment of the voltage converter, the power factor correction circuit is implemented by an inverter, said inverter comprising coils constituting phases of an electric motor, said inverter further comprising switching means associated with each of said phases. In addition, upon the powering of the electrical equipment item from a single-phase electrical network, a first and a second phase of the electric motor are intended to be connected to the electrical network, a third phase of the electric motor and the switching means associated with the third phase respectively constituting the inductor and the switch of the absorption circuit, and said switching means being controlled by the control module of the absorption circuit to vary the charging of the capacitor as a function of the ripple of the first current in order to attenuate the power ripple.

The invention also relates to the use of a voltage converter according to the invention as charger of accumulation means.

The invention also relates to a method for absorbing a power ripple delivered by a power factor correction circuit to an electrical equipment item, a circuit comprising a capacitor mounted in series with an inductor and at least one switch being connected in parallel with the electrical equipment item. The method comprises:
- the measurement of a first current delivered to said electrical equipment item by the power factor correction circuit;
- the control of the switch to vary the charging of the capacitor as a function of the ripple of the first current in order to attenuate the power ripple.

According to one embodiment of the method, the first current corresponds to the DC part of a current delivered by the power factor correction circuit.

According to one embodiment, the method comprises:
- also the measurement of a second current passing through the capacitor;
- the control of the value of the second current passing through the capacitor to a first reference value; and
- the control of the first reference value as a function of the first current powering said electrical equipment item.

According to one embodiment, the method comprises:
the measurement of the voltage at the terminals of the capacitor, and
the control of the voltage at the terminals of the capacitor such that it remains within a predefined interval.

According to one embodiment, the power factor correction circuit is connected at the input to a three-phase power supply network.

According to one embodiment, the power factor correction circuit is connected at the input to a single-phase power supply network.

According to one embodiment, the electrical equipment item consists of accumulation means.

The invention also relates to an absorption circuit for absorbing a power ripple intended to be connected in parallel to an electrical equipment item powered by a power factor correction circuit, said absorption circuit being of voltage step-down type and comprising:
a capacitor mounted in series with an inductor and at least one switch,
a control module,
measurement means for measuring a first current intended to power said electrical equipment item
the switch being controlled by the control module to vary the charging of the capacitor as a function of the ripple of the first current in order to attenuate the power ripple, and
said circuit further comprising measurement means for measuring the voltage at the terminals of the capacitor, and the control module being configured to lock a second current passing through the capacitor in such a way that the voltage at the terminals of the capacitor remains within a predefined interval.

This circuit can comprise any one of the features described previously.

In particular, according to one embodiment, the control module comprises a control loop for controlling the current passing through the capacitor configured to receive a current setpoint, said setpoint being determined as a function of the difference between the voltage at the terminals of the capacitor and a given voltage value so as to regulate the DC component of the voltage of the capacitor to said value.

According to one embodiment, the control module comprises at least one limitation unit configured to limit the current flowing through the capacitor such that the voltage at the terminals of the capacitor remains less than or equal to a maximum value and/or greater than or equal to a minimum value.

According to one embodiment, the control module comprises:
a first control loop configured to lock the value of the second current passing through the capacitor to a first reference value, and
a second control loop configured to lock the first reference value as a function of the first current powering said electrical equipment item.

According to one embodiment, the second control loop comprises a bandpass filter in order to filter the DC component and the frequencies linked to the noise in the first current powering said electrical equipment item.

According to one embodiment, the second control loop further comprises means for subtracting the output of the bandpass filter from the setpoint to establish the first reference value.

The invention also relates to a method for absorbing a power ripple delivered by a power factor correction circuit to an electrical equipment item, the method comprising:

the connection of a circuit comprising a capacitor mounted in series with an inductor and at least one switch in parallel with the electrical equipment item,
the measurement of a first current delivered to said electrical equipment item by the power factor correction circuit,
the control of the switch to vary the charging of the capacitor as a function of the ripple of the first current in order to attenuate the power ripple,
the measurement of the voltage at the terminals of the capacitor, and the control of a second current passing through the capacitor in such a way that the voltage at the terminals of the capacitor remains within a predefined interval.

This method can comprise any one of the features described previously.

In particular, according to one embodiment, the method comprises:
the determination of a current setpoint as a function of the difference between the voltage at the terminals of the capacitor and a given voltage value,
the control of the current passing through the voltage capacitor, comprising the reception of said setpoint, so as to regulate the DC component of the voltage of the capacitor to said value.

According to one embodiment, the method comprises the limitation of the current flowing through the capacitor such that the voltage at the terminals of the capacitor remains less than or equal to a maximum value and/or greater than or equal to a minimum value.

According to one embodiment, the method comprises:
the measurement of the second current passing through the capacitor,
a first control of the value of the second current passing through the capacitor to a first reference value, and
a second control of the first reference value as a function of the first current ($I_3$) powering said electrical equipment item.

According to one embodiment, the second control comprises a filtering by a bandpass filter of the DC component and of the frequencies linked to the noise in the first current powering said electrical equipment item.

According to one embodiment, the second control further comprises the subtraction of the output of the bandpass filter from the setpoint to establish the first reference value.

Other features and advantages of the invention will become apparent from the description that will now be given thereof, with reference to the attached drawings which represent thereof, by way of indication but in a nonlimiting manner, one possible embodiment.

In these drawings.

In all the figures, the identical elements bear the same reference numbers.

In the description below, the following are designated generally:

the term "metal-oxide semiconductor field effect transistor (MOSFET)" corresponds to a field effect transistor with metal-oxide gate;

the term "insulated gate bipolar transistor (IGBT)" refers to a bipolar transistor with insulated gate and corresponds to a hybrid transistor, combining a metal-oxide semiconductor field effect transistor (MOSFET) at the input and a bipolar transistor at the output.

Figure 2:
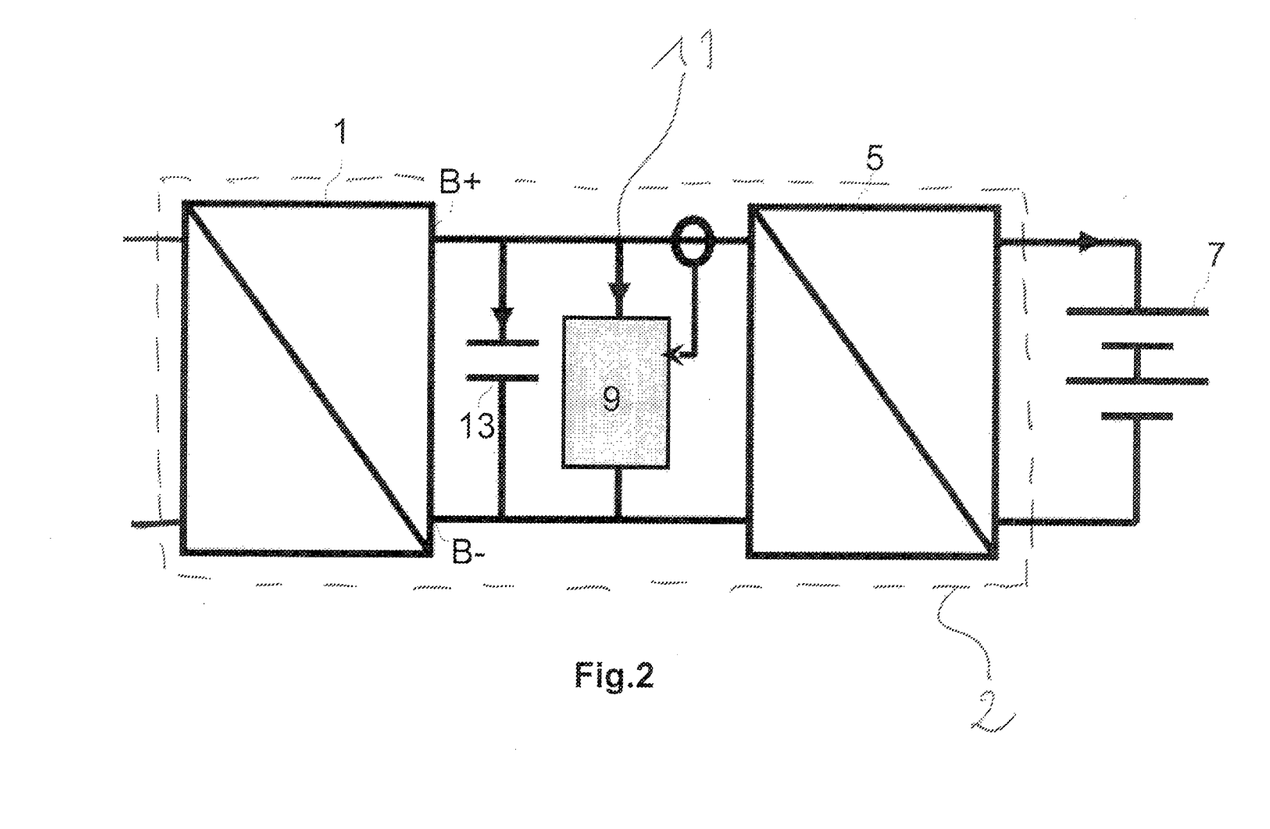
FIG. 2 represents an electrical circuit diagram of a battery charger according to one embodiment of the present invention.

The embodiments of the present invention relate to the use of a circuit for absorbing a power ripple at the output of a power factor corrector. FIG. 2 represents an exemplary layout of such a power ripple absorption circuit 9 in a charger 2 of a battery 7. The charger 2 comprises a power factor corrector 1 connected to an electrical network. The corrector 1 comprises two output terminals denoted B+ and B−, a high output terminal B+ and a low output terminal B− generally corresponding to the ground. The power ripple absorption circuit 9 is connected between the high output terminal B+ and the low output terminal B− of the power factor corrector 1. Moreover, a capacitor 13 is also connected between the two terminals of the power factor corrector 1. This capacitor 13 is used to resolve the coupling problems, for example to avoid the problems of overvoltage when the switches of the different electrical equipment items are closed (power factor corrector 1 or absorption circuit 9) and its value is relatively low, of the order of 100 μF. However, this capacitor 13 could be dispensed with. The power ripple absorption circuit 9 is a circuit of step-down or "buck" type comprising a capacitor mounted in series with an inductor and at least one switch which makes it possible to regulate the current flowing in the capacitor. The charger 2 comprises an electrical node 11 to which are linked three branches. The first branch is linked to the high output terminal B+ of the power factor corrector 1. The second branch is linked to the absorption circuit 9. The third branch is linked to an electrical equipment item that is to be powered by a DC power.

Moreover, in order to adapt the voltage delivered between the high output terminal B+ and the low output terminal B− to the voltage that can be accepted by the accumulation means 7, generally a battery, a DC voltage converter 5 is used. However, if this voltage that can be accepted by the accumulation means is greater than the voltage delivered between the terminals B+ and B−, it is then possible to dispense with the DC voltage converter 5 and connect the battery directly to the output of the absorption circuit 9.

Figure 3:
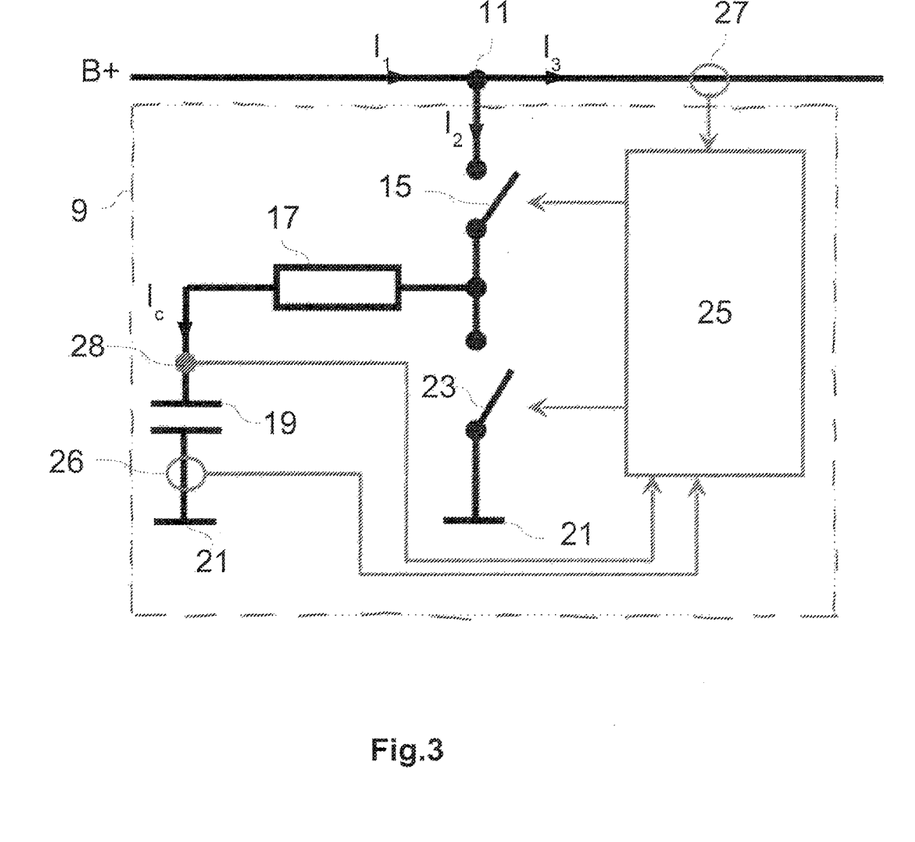
FIG. 3 represents an electrical circuit diagram of a power ripple absorption circuit according to an embodiment of the present invention.

FIG. 3 represents an example of an embodiment of the power ripple absorption circuit 9. The circuit 9 is a half-bridge circuit. The absorption circuit 9 comprises a first switch 15 linked on the one hand to the electrical node 11 and on the other hand to a first terminal of the inductor 17. The second terminal of the inductor 17 is linked to the first terminal of the capacitor 19 whose second terminal is linked to the low output terminal B− of the power factor corrector 1, that is to say, to the ground 21. The absorption circuit 9 also comprises a second switch 23 linked on the one hand to the first terminal of the inductor 17 and on the other hand to the ground 21. In operation, the opening and the closing of the switches 15 and 23 are synchronized and opposed such that, when one is open, the other is closed. Thus, the two switches 15 and 23 can be replaced by a single switch corresponding to the first switch 15 for which the open position would correspond to a position linked to the ground.

The switches are implemented, for example, by the association of a transistor of IGBT or MOSFET type in parallel with a diode.

The switches 15 and 23 are controlled by a control module 25 of the means 27 which measure a first current or resultant current on the third branch of the electrical node 11 denoted. $I_3$. The control module 25 controls the position of the switches 15 and 23 as a function of the intensity of the measured resultant current $I_3$. In effect, at the electrical node 11, the sum of the incoming currents is equal to the sum of the outgoing currents such that the resultant current $I_3$ is equal to the difference between the current $I_1$ supplied by the high output terminal B+ of the power factor corrector 1 and the current $I_2$ passing through the second branch ($I_2=I_2+I_3$). Thus, by controlling the switches 15 and 23 it is possible to modify the current $I_2$ and therefore the resultant current $I_3$. The idea is therefore to control the switches 15 and 23 in such a way that $I_3$ corresponds to the DC part of $I_1$.

Moreover, other constraints have to be taken into account in the absorption circuit 9. In effect, the voltage at the terminals of the capacitor 19 must remain below its flashover voltage and greater than 0 V (in the case of a half-bridge installation presented hereinbelow). Thus, in order to control the operation of the capacitor 19, the control module 25 also comprises measurement means 26 for measuring the current $I_c$ passing through the capacitor 19 and measurement means 28 for measuring the voltage $V_c$ at the terminals of the capacitor 19. The control of the switches 15 and 23 is therefore also modulated as a function of the value of the current $I_c$ and of the voltage $V_c$ at the terminals of the capacitor 19.

Figure 4:
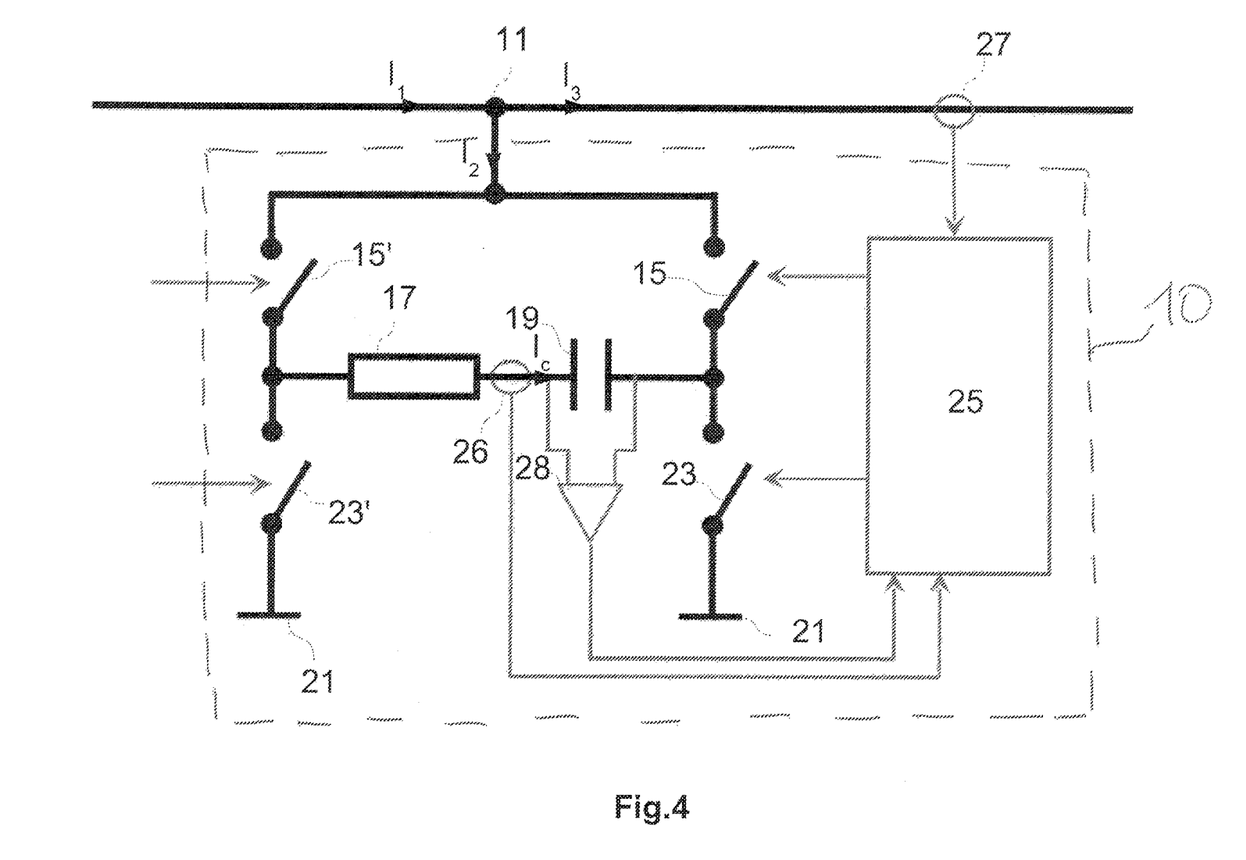
FIG. 4 represents an electrical circuit diagram of a power ripple absorption circuit according to another embodiment of the present invention.

Increasing the extent of the voltage range at the terminals of the capacitor 19 makes it possible to improve the storage efficiency in the capacitor 19, and thus reduce the value of this capacitor 19. To this end, full-bridge configuration absorption circuit 10 can be used, an exemplary embodiment of which is shown in FIG. 4. The circuit 10 comprises two symmetrical parallel branches each comprising a first switch 15, 15' linked to the electrical node 11 on the one hand and to a second switch 23, 23' on the other hand, the second switch 23, 23' being linked to the ground 21 at its other end. The two switches of each of the parallel branches operate in a synchronized and opposing manner, the four switches being controlled by the control module 25. The circuit 10 also comprises a branch linked to each end of the common terminal of the two switches 15, 15', 23, 23'. This branch comprises a capacitor 19 in series with an inductor 17.

Moreover, as for the half-bridge circuit 9, the two switches 15, 15', 23, 23' of each parallel branch can be replaced by a single switch linked in a first position to the electrical node 11 and in a second position to the ground 21.

Figure 5A:
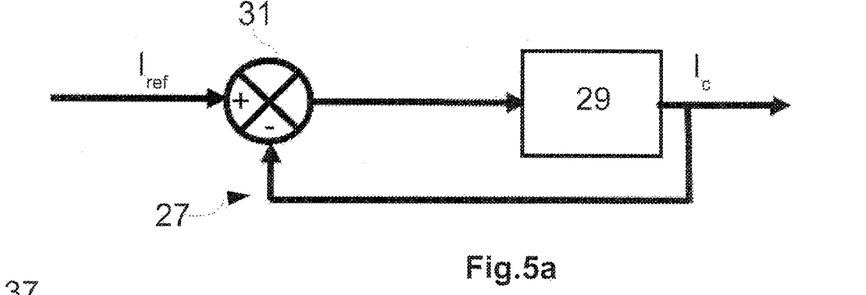
FIG. 5a represents a first control loop.

The operation of the frequency ripple absorption circuit 9, 10 will now be described in detail on the basis of the diagrams in FIGS. 5*a* and 5*b*. The control module 25 comprises a first control loop 27 represented in FIG. 5*a* which makes it possible to regulate the current $I_c$ passing through the capacitor 19 to a first reference value $I_{ref}$. A control module 29 of the switches of the absorption circuit 9, 10 is controlled by the output of a subtractor 31 whose inputs are the first reference value $I_{ref}$ and the current $I_c$ of the capacitor 19 such that $I_c$ is regulated to the first reference value $I_{ref}$.

Figure 5B:
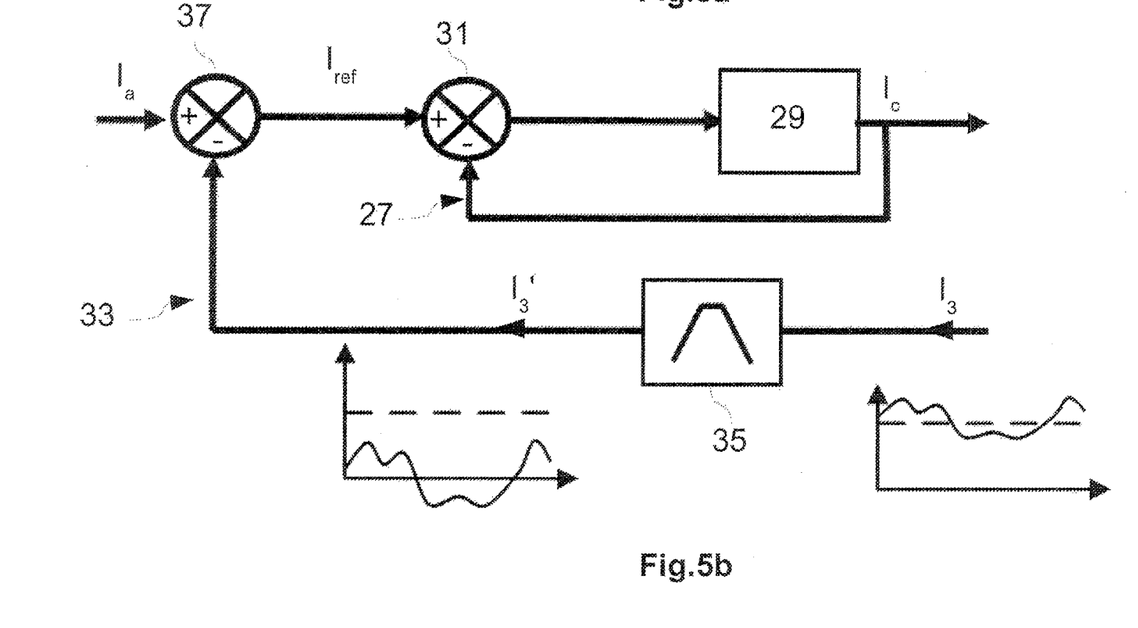
FIG. 5b represents the first control loop interleaved with a second control loop.

FIG. 5b represents the first control loop 27 interleaved with a second control loop 33. The second loop 33 modifies the first reference value $I_{ref}$ as a function of the variations of the resultant current $I_3$. In order to modulate the first reference value $I_{ref}$ only as a function of the sinusoidal part of the resultant current $I_3$, a bandpass filter 35 is applied to the current $I_3$ which makes it possible to eliminate the DC part and the high frequencies corresponding to the noise. The current $I_3'$ obtained at the output of the bandpass filter 35 is transmitted to a subtractor 37 whose other input receives a second reference value $I_a$ corresponding to a setpoint. The output of the subtractor 37 corresponds to the first reference value $I_{ref}$. Thus, the reference value $I_{ref}$ is modulated only as a function of the variations of the sinusoidal part of the resultant current $I_3$, which is the part that is required to be eliminated.

Figure 6:
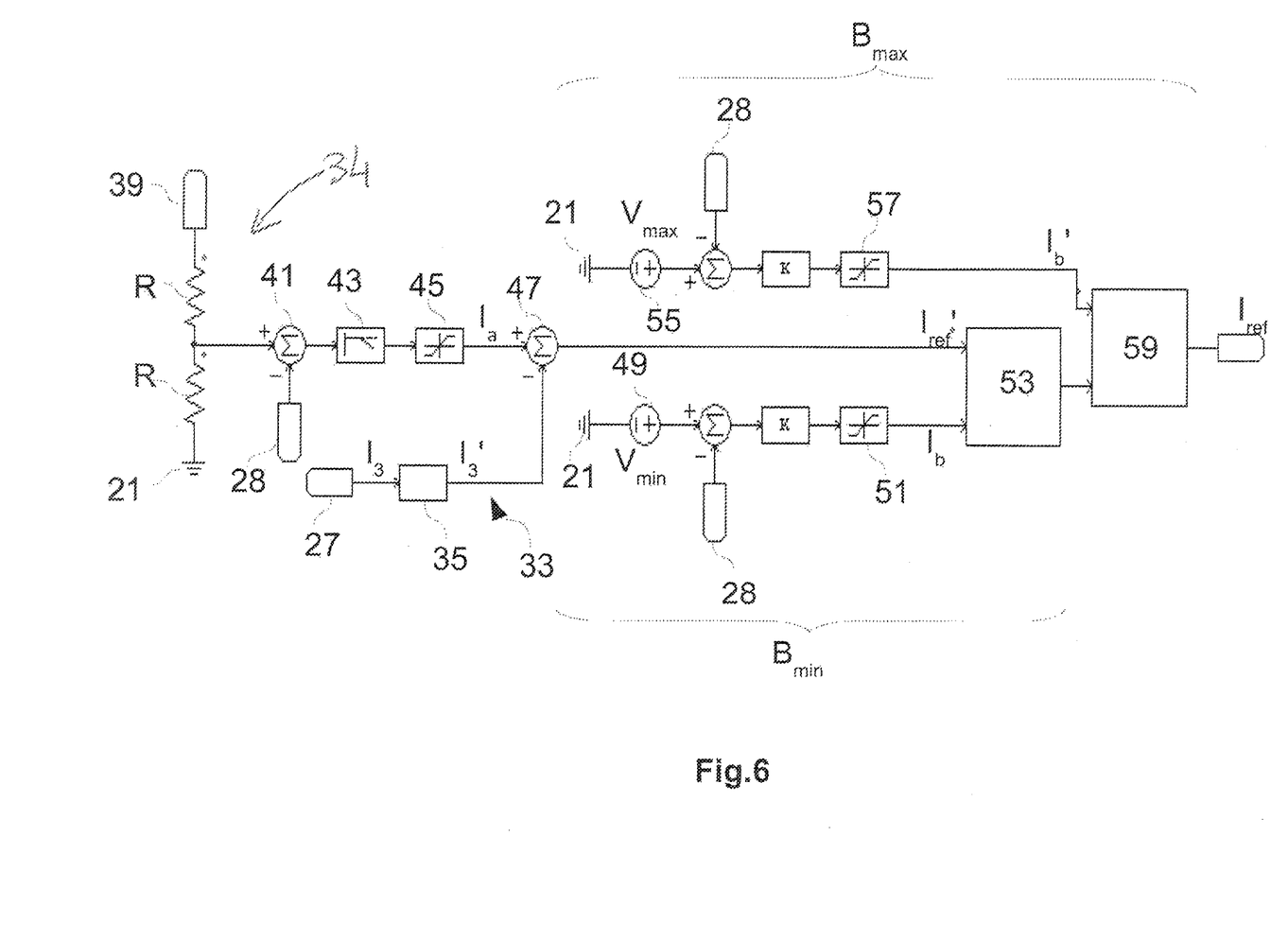
FIG. 6 represents an electrical circuit diagram of a reference current generation circuit.

FIG. 6 represents an exemplary embodiment of a circuit making it possible to obtain the first reference value $I_{ref}$. The circuit comprises an exemplary embodiment of the second control loop 33 which comprises a subtractor 47 and a filter 35. The filter 35 extracts the sinusoidal part $I_3'$ from the resultant current $I_3$. In the subtractor 47, the sinusoidal part $I_3'$ is subtracted from the second reference value $I_a$ to obtain the first reference value $I_{ref}$ to which the current passing through the capacitor 19 is required to be controlled.

In order to keep the voltage at the terminals of the capacitor 19 within an acceptable range, the second reference value $I_a$ is also controlled as a function of the voltage $V_c$ at the terminals of the capacitor 19. The voltage $V_c$ of the capacitor 19 is regulated to an acceptable value, for example half the voltage of the battery in the case where a battery is being recharged. The circuit in FIG. 6 comprises an exemplary unit 34 for controlling the second reference value $I_a$. Unit 34 comprises measurement means 39 for measuring the voltage of the battery 7 denoted $V_{bat}$ (in the case where a reference voltage is used that corresponds to half the voltage of the battery 7) and two resistors denoted R mounted in voltage divider bridge configuration to recover a voltage $V_{bat}/2$ equal to half the voltage $V_{bat}$ of the battery 7. A subtractor 41 establishes the difference between this voltage $V_{bat}/2$ and the voltage $V_c$ at the terminals of the capacitor 19 supplied by the measurement means 28. This difference $(V_{bat}/2-V_c)$ is filtered by a low-pass filter 43 to eliminate the high frequencies corresponding to the noise. In order to avoid saturation at the output of the low-pass filter, high and low limits are applied by a filter 45. The second reference value $I_a$ to be applied to the capacitor 19 to obtain the voltage value $V_{bat}/2$ at the terminals of the capacitor 19 is then obtained.

However, to avoid any divergence of this voltage during transient phenomena (notably in order to avoid flashover of the capacitor 19), the second reference value $I_{ref}$ is limited. When the voltage $V_c$ of the capacitor reaches a minimum threshold $V_{min}$ or a maximum threshold $V_{max}$ the circuit 9, 10 changes state. These thresholds $V_{min}$, $V_{max}$ are predetermined thresholds, for example 100 V and 600 V in the case of a half-bridge circuit. Thus, when the minimum threshold $V_{min}$ is reached, the switches of the circuit 9, 10 are controlled to raise the voltage $V_c$ of the capacitor 19 and when the maximum threshold $V_{max}$ is reached, the switches of the circuit 9, 10 are controlled to lower the voltage $V_c$ of the capacitor 9, 10 regardless of the variations of the resultant current $I_3$.

The circuit in FIG. 6 also comprises units $B_{min}$ and $B_{max}$ for such a limitation. To keep the voltage $V_c$ of the capacitor 19 within a predetermined interval, the value $I_{ref}'$ obtained at the output of the subtractor 47 of the second control loop 33 is limited by virtue of the two units $B_{min}$ and $B_{max}$ which respectively define the minimum voltage threshold $V_{min}$ and the maximum voltage threshold $V_{max}$ acceptable for the voltage $V_c$.

In the first unit $B_{min}$, a subtractor 49 is used to establish the difference between a minimum voltage threshold $V_{min}$, for example 100 V, and the voltage $V_c$ supplied by the measurement means 28. An amplifier 50 applies a gain K to the voltage $V_{Rmin}$ delivered by the subtractor 49. Then, a limiter 51 applies saturation limits to obtain the value of the current $I_b$ to which the current $I_c$ of the capacitor 19 must be regulated to obtain the voltage $V_{Rmin}$ at the capacitor 19. In a comparator 53, the current value $I_b$ obtained at the output of the limiter 51 is then compared with the current value $I_{ref}'$ obtained from the second current loop 33. The comparator 53 delivers a current value $I_{ref}''$ corresponding to the maximum value between these two values.

In the second unit $B_{max}$, a subtractor 55 is used to establish the difference between a maximum voltage threshold $V_{max}$, for example 600 V, and the voltage $V_c$ supplied by the measurement means 28. An amplifier 56 amplifies the voltage value $V_{Rmax}$ delivered by the subtractor 55. Then, a limiter 57 applies saturation limits to obtain the current value $I_b'$ to which the current $I_c$ of the capacitor 19 must be regulated to obtain the voltage $V_{Rmax}$ at the capacitor 19. In a comparator 59, the value of the current $I_b'$ obtained from the limiter 57 is then compared with the value of the current $I_{ref}''$ obtained from the comparator 53 of the first unit $B_{min}$. The comparator 59 keeps the minimum value to obtain the first reference current $I_{ref}$ which is then transmitted to the control module 29 of the first current loop 27 presented in FIG. 5a.

Figure 7:
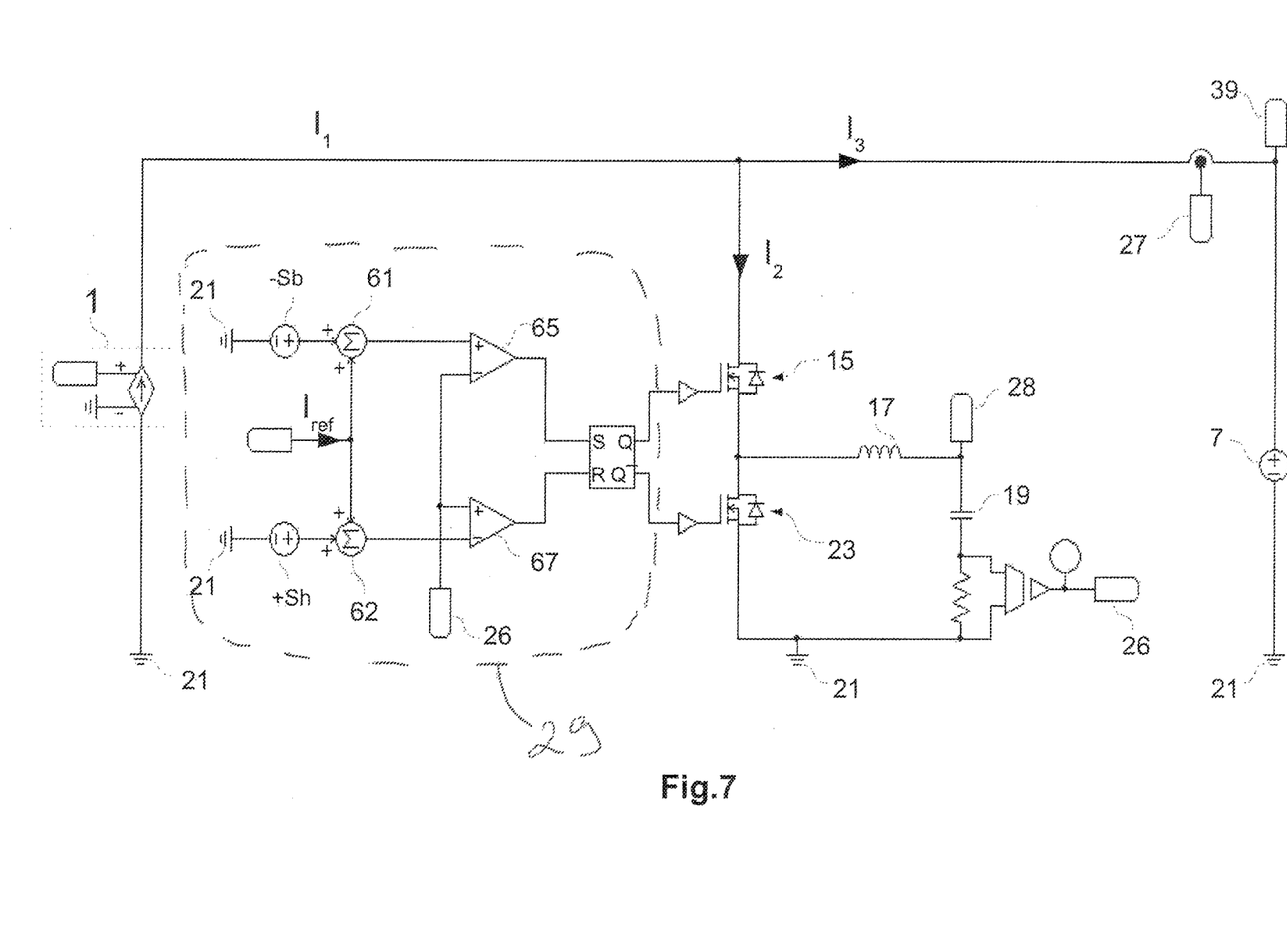
FIG. 7 represents an electrical circuit diagram of a power ripple absorption circuit in which the switches are controlled by a hysteresis control module.

The opening and the closing of the switches of the absorption circuit 9, 10 are then controlled for the current $I_c$ of the capacitor 19 to correspond to the first reference current value $I_{ref}$. FIG. 7 represents an exemplary embodiment of the control module 29 of the switches of the circuit 9, 10 based on the setpoint $I_{ref}$ in the case of a hysteresis control. The current $I_{ref}$ obtained at the output of the comparator 59 of the second unit $B_{max}$ is transmitted to a first summer 61 to define a low threshold $I_{ref}$-Sb, for example $I_{ref}$-4. The current $I_{ref}$ is also transmitted to a second summer 62 to define a high threshold $I_{ref}$+Sh, for example $I_{ref}$+4. The low threshold is sent to a first comparator 65 to be compared with the value of the current $I_c$ of the capacitor 19 supplied by the measurement means 26. The output of the first comparator 65 has the value 1 when the difference between the low threshold and the current Ic of the capacitor 19 is positive and has the value 0 otherwise. The high threshold is sent to a second comparator 67 to be compared with the value of the current $I_c$ of the capacitor 19 supplied by the measurement means 26. The output of the second comparator 67 has the value 1 when the difference between the current $I_c$ of the capacitor and the high threshold is positive and has the value 0 otherwise. The introduction of the high and low thresholds makes it possible to limit the switching frequency of the switches of the absorption circuit 9, 10. The outputs of the first 65 and of the second 67 comparators are sent respectively to the inputs S and R of an RS flip-flop 69.

The output Q of the RS flip-flop is linked to a switch of the absorption circuit 9, 10 and controls the closing of the switch 15 when the output Q is at 1. The output Q⁻ of the RS flip-flop is linked to another switch 23 of the absorption circuit 9, 10 and controls the closing of the switch 23 when the output Q⁻ is at 1. The control of the switches 15, 23 therefore makes it possible to control the current $I_c$ of the capacitor 19 between the values $I_{ref}$–Sb and $I_{ref}$+Sh.

Figure 8:
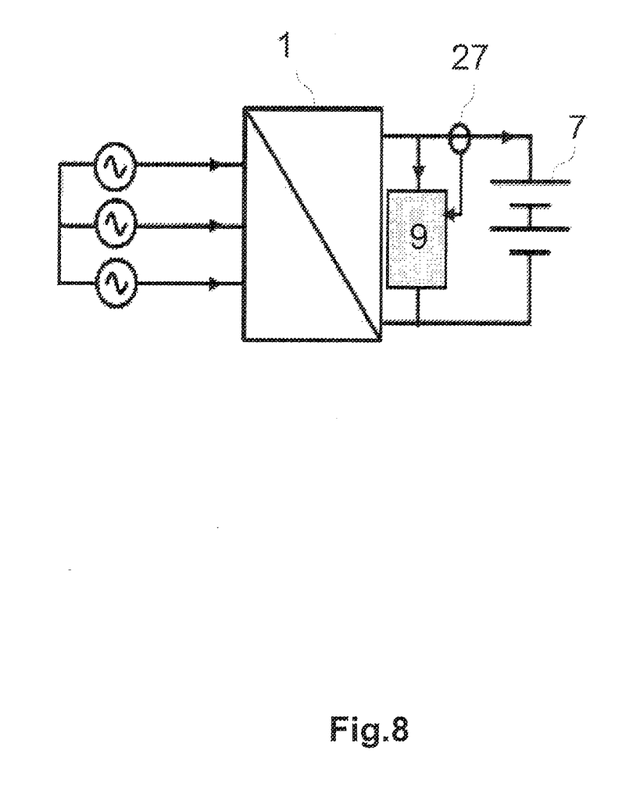
FIG. 8 represents an electrical circuit diagram of a voltage converter according to an embodiment of the present invention connected to a three-phase network.

The absorption circuit 9, 10 can also be used at the terminals of a power factor corrector 1 connected to a three-phase network as represented in FIG. 8. In effect, the three-phase networks are not always perfectly balanced such that there is also a sinusoidal component of the output of a power factor corrector 1 connected to a three-phase network. In this case, the use of a power ripple absorption circuit 9, 10 also makes it possible to eliminate the sinusoidal component. If the battery 7 supports the voltage delivered at the output of the absorption circuit 9, 10, the charger can then consist solely of a power factor corrector 1 and an absorption circuit 9, 10 as described previously.

The embodiments of the present invention can be implemented in a power factor corrector implemented by a voltage inverter linked on the one hand to the phases of a three-phase motor 72 and on the other hand to accumulation means such as, for example, a battery. The voltage inverter is, for example, such as those described in the French patent applications FR2938711 and FR2944391 of the applicant.

Figure 9:
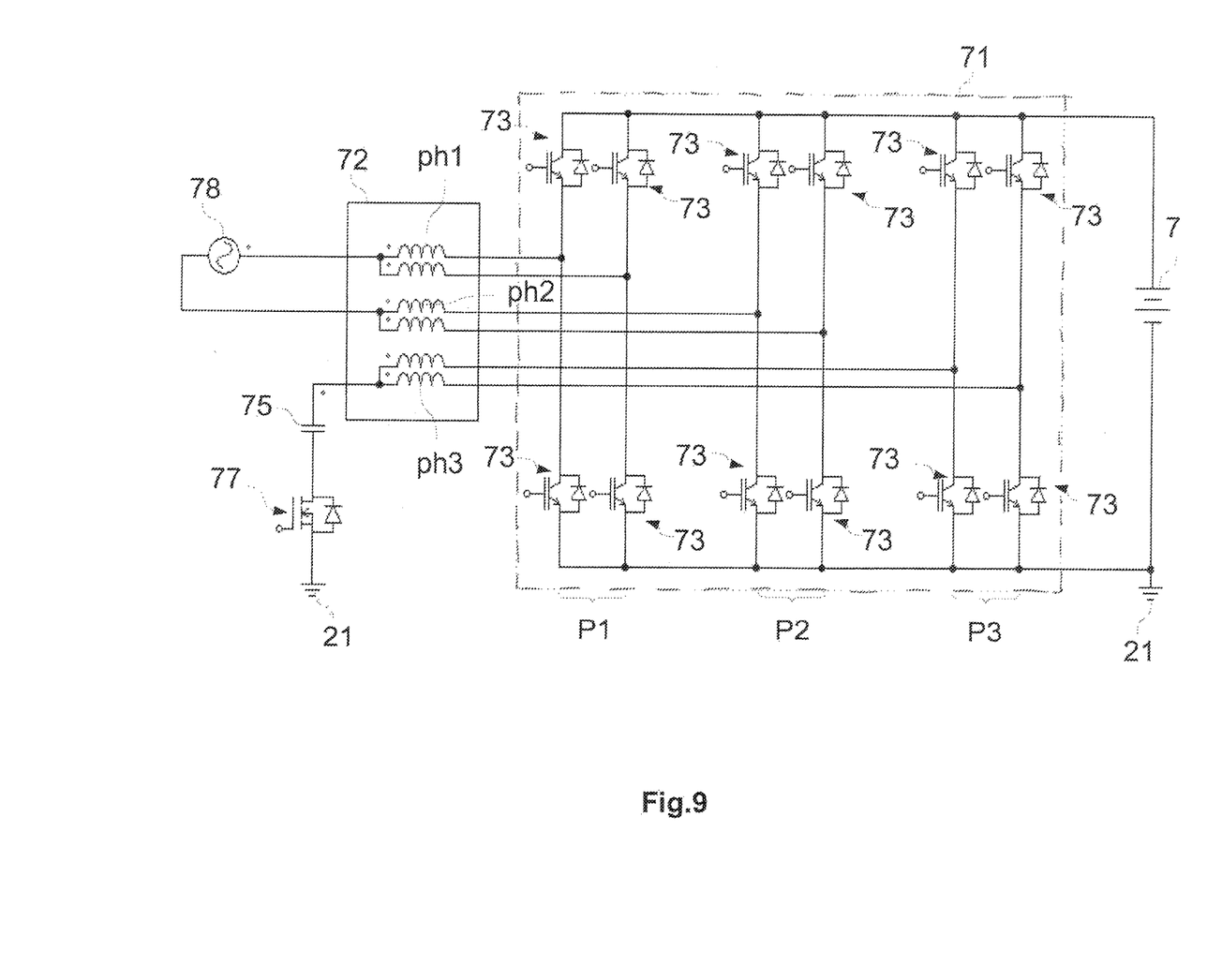
FIG. 9 represents an electrical circuit diagram of a voltage converter comprising an inverter in which one of the bridges is used to form a power ripple absorption circuit according to an embodiment of the present invention.

FIG. 9 represents an exemplary diagram of the electrical charging circuit of the battery 7 in the case of an H-configuration bridge inverter 71 comprising three H-configuration bridges denoted P1, P2 and P3, each bridge P1, P2 and P3 comprising two branches of two switching means, for example switches 73, the mid-points of the branches being linked to the phases ph1, ph2 and ph3 of the motor 72 and the ends of the branches being linked to the battery 7. In order to recharge the battery 7 on a single-phase network 78, the mid-points of two of the phases of the motor, for example ph1 and ph2, are connected to the network and a capacitor 77 is connected to the mid-point of the third phase ph3. The capacitor 77 is also linked to the ground 21 via a switch 77 which is in closed position when the battery 7 is being charged and in the open position otherwise. The third phase ph3 in series with the capacitor 75 and the switches 73 of a branch of the H-configuration bridge P3 powering the third phase ph3 then constitute the absorption circuit for absorbing a power ripple delivered by the other two phases of the inverter 71. By controlling the switches 73 of the duly formed matching circuit 9 as described in the preceding embodiments, the sinusoidal part of the current delivered by the inverter 71 to the battery 7 is absorbed, which makes it possible to deliver a DC current to the battery 7 and therefore a DC power.

Thus, the absorption circuit makes it possible to control, through the control of the switches, the value of the current $I_c$ passing through the capacitor 19 in such a way that the current $I_2$ absorbed by the absorption circuit 9, 10 corresponds to the sinusoidal part of the current $I_1$ delivered by the power factor corrector 1. The resultant current $I_3$ then corresponds to the DC value of the current $I_1$. The capacitance value of the capacitor 19 that is necessary in the absorption circuit 9, 10 is very much lower than the capacitance values that are needed to absorb the sinusoidal part of the current $I_1$ in the absence of such a circuit 9, 10. Since the capacitance values of the capacitor 19 are relatively low, of the order of a hundred or so μF, film-type capacitors can be used. Furthermore, as explained previously, the control can take into account the value of the voltage $V_c$ at the terminals of the capacitor 19 in such a way as to keep the value of the voltage $V_c$ at the terminals of the capacitor 19 within a predefined interval. Finally, it should be noted that the absorption circuit 9, 10 can be used at the output of a power factor corrector powered by a single-phase or three-phase electrical network.

The circuit in FIG. 6 makes it possible to regulate the voltage $V_c$ of the capacitor 19 to an acceptable value, for example half $V_{bat}/2$ of the voltage $V_{bat}$ of the battery. In particular, the DC component of the voltage $V_c$ at the terminals of the capacitor 19 can be regulated to half $V_{bat}/2$ of the voltage $V_{bat}$ of the battery, notably by virtue of the low-pass filter 43 of the unit 34 to control the second reference value $I_a$. The low-pass filter 43 can deliver as output the DC component of the setpoint $I_a$.

However, the regulation to half $V_{bat}/2$ of the voltage $V_{bat}$ of the battery is an example. The regulation of the voltage $V_c$ at the terminals of the capacitor 19, in particular of the DC component of this voltage $V_c$, can be implemented with any value that guarantees that the voltage $V_c$ remains within a predefined interval. Thus, there is an assurance that the swing of the voltage $V_c$ of the capacitor will not drip while the absorption circuit 9, 10 is operating.

Furthermore, the circuit in FIG. 6 can make it possible to regulate the voltage $V_c$ of the capacitor 19 in such a way that the voltage $V_c$ at the terminals of the capacitor 19 remains within a predefined interval 3 by virtue of the limitation units Bmin, Bmax. In particular, the unit Bmax is configured to limit the current Ic flowing through the capacitor 19 such that the voltage Vc at the terminals of the capacitor 19 remains less than or equal to a maximum value Vmax. The limitation unit Bmin is notably configured to limit the current Ic flowing through the capacitor 19 such that the voltage Vc at the terminals of the capacitor 19 remains greater than or equal to a minimum value Vmin.

The invention claimed is:

1. An absorption circuit for absorbing a power ripple, connected in parallel to an electrical equipment item powered by a power factor correction circuit, said absorption circuit being of voltage step-down type and comprising:
   a capacitor mounted in series with an inductor and at least one switch;
   a control module;
   measurement means for measuring a first current intended to power said electrical equipment item,
   the switch being controlled by the control module to vary the charging of the capacitor as a function of the ripple of the first current in order to attenuate the power ripple; and
   measurement means for measuring the voltage at the terminals of the capacitor, and the control module being configured to lock a second current passing through the capacitor in such a way that the voltage at the terminals of the capacitor remains within a predefined interval,
   wherein the control module comprises at least one limitation unit configured to limit the current flowing through the capacitor such that the voltage at the terminals of the capacitor remains less than or equal to a maximum value and/or greater than or equal to a minimum value.

2. The absorption circuit as claimed in claim 1, wherein the control module comprises a control loop for controlling the current passing through the capacitor configured to receive a current setpoint, said setpoint being determined as a function of the difference between the voltage at the terminals of the capacitor and a given voltage value so as to regulate the DC component of the voltage of the capacitor to said value.

3. The absorption circuit as claimed in claim 2, wherein the second control circuit further comprises means for subtracting the output of the bandpass filter from the setpoint to establish the first reference value.

4. The absorption circuit as claimed in claim 1, wherein the control module comprises:
   a first control loop configured to lock the value of the second current passing through the capacitor to a first reference value, and
   a second control loop configured to lock the first reference value as a function of the first current powering said electrical equipment item.

5. The absorption circuit as claimed in claim 4, wherein the second control loop comprises a bandpass filter in order to filter the DC component and the frequencies linked to the noise in the first current powering said electrical equipment item.

6. The absorption circuit as claimed in claim 1, comprising a branch having at least one switch controlled by the control module and connected to an end of the capacitor and of the inductor mounted in series.

7. The absorption circuit as claimed in claim 1, comprising two branches connected on either side of the capacitor and of the inductor mounted in series,
   said two branches comprising switches connected in series and being intended to be mounted in parallel with the electrical equipment item,
   the switches being controlled by the control module to vary the charging of the capacitor as a function of the ripple of the first current in order to attenuate the power ripple.

8. An AC voltage to DC voltage converter intended to power an electrical equipment item comprising a power factor correction circuit connected to an absorption circuit as claimed in claim 1.

9. The voltage converter as claimed in claim 8, wherein the power factor correction circuit is implemented by an inverter,
   said inverter comprising coils constituting phases of an electric motor and switching means associated with each of said phases,
   in which, upon the powering of the electrical equipment item from a single-phase electrical network;
   a first and a second phase of the electric motor are intended to be connected to the electrical network,
   a third phase of the electric motor and the switching means associated with the third phase respectively constituting the inductor and the switch of the absorption circuit, said switching means being controlled by the control module of the absorption circuit to vary the charging of the capacitor as a function of the ripple of the first current in order to attenuate the power ripple.

10. The voltage converter as claimed in claim 8, wherein the voltage converter is used as a charger of accumulation means.

11. A method for absorbing a power ripple delivered by a power factor correction circuit to an electrical equipment item, the method comprising:
    connection of a circuit comprising a capacitor mounted in series with an inductor and at least one switch in parallel with the electrical equipment item;
    measurement of a first current delivered to said electrical equipment item by the power factor correction circuit;
    control of the switch to vary the charging of the capacitor as a function of the ripple of the first current in order to attenuate the power ripple;
    measurement of the voltage at the terminals of the capacitor; and control of a second current passing through the capacitor in such a way that the voltage at the terminals of the capacitor remains within a predefined interval; and
    limitation of the current flowing through the capacitor such that the voltage at the terminals of the capacitor remains less than or equal to a maximum value and/or greater than or equal to a minimum value.

12. The method as claimed in claim 11, comprising:
    the determination of a current setpoint as a function of the difference between the voltage at the terminals of the capacitor and a given voltage value;
    the control of the current passing through the voltage capacitor, comprising the reception of said setpoint, to regulate the DC component of the voltage of the capacitor to said value.

13. The method as claimed in claim 12, wherein the second control further comprises the subtraction of the output of the bandpass filter from the setpoint to establish the first reference value.

14. The method as claimed in claim 11, further comprising:
    measurement of the second current passing through the capacitor;
    a first control of the value of the second current passing through the capacitor to a first reference value; and
    a second control of the first reference value as a function of the first current powering said electrical equipment item.

15. The method as claimed in claim 14, wherein the second control comprises a filtering by a bandpass filter of the DC component and of the frequencies linked to the noise in the first current powering said electrical equipment item.

16. The method as claimed in claim 11, wherein the power factor correction circuit is connected at the input to a three-phase power supply network.

17. The method as claimed in claim 11, wherein the power factor correction circuit is connected at the input to a single-phase power supply network.

18. The method as claimed in claim 11, wherein the electrical equipment item consists of accumulation means.

* * * * *